United States Patent
Singh

(10) Patent No.: US 12,530,323 B2
(45) Date of Patent: Jan. 20, 2026

(54) STREAMLINED FILE SYSTEM MEMORY INPUT/OUTPUT OPERATIONS

(71) Applicant: MICROSOFT TECHNOLOGY LICENSING, LLC, Redmond, WA (US)

(72) Inventor: Neeraj Kumar Singh, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/442,807

(22) Filed: Feb. 15, 2024

(65) Prior Publication Data

US 2025/0265231 A1    Aug. 21, 2025

(51) Int. Cl.
*G06F 16/00*    (2019.01)
*G06F 16/172*   (2019.01)
*G06F 16/176*   (2019.01)
*G06F 16/178*   (2019.01)

(52) U.S. Cl.
CPC ........ *G06F 16/1774* (2019.01); *G06F 16/172* (2019.01); *G06F 16/178* (2019.01)

(58) Field of Classification Search
CPC ... G06F 16/1774; G06F 16/172; G06F 16/178
See application file for complete search history.

(56) References Cited

U.S. PATENT DOCUMENTS

| | | |
|---|---|---|
| 5,596,754 A | 1/1997 | Lomet |
| 2007/0198781 A1 | 8/2007 | Dice et al. |
| 2021/0248081 A1 | 8/2021 | Jakkula |

FOREIGN PATENT DOCUMENTS

CN    111552574 A  *  8/2020   ........... G06F 9/3009

OTHER PUBLICATIONS

Schmuck et al., "GPFS: A Shared-Disk File System for Large Computing Clusters",2002, USENIX, pp. 1-18 (Year: 2002).*
Burns et al., "Semi-Preemtible Locks for a Distributed File System",2000,IEEE, pp. 397-404 (Year: 2000).*
Extended European search report received in European Application No. 25156368.0, mailed on Jun. 2, 2025, 16 pages.
(Continued)

*Primary Examiner* — Alexander Khong
(74) *Attorney, Agent, or Firm* — Newport IP, LLC; Jacob P. Rohwer

(57) ABSTRACT

The techniques disclosed herein enable file systems to streamline operations on cached file data. This is accomplished by utilizing a direct access path and an optimization flag that indicates the status of an external lock for a given file data. External locks can be utilized to lock some or all of a file to prevent unexpected changes during an operation and ensure consistency in file data. A direct access path is a file system method that enables a thread to directly access the storage locations defined by a cache map structure which reduces latency by omitting determinations of external lock conflicts. However, this omission must be performed safely, that is, when the external lock is inactive. By checking the optimization flag prior to executing an operation, the file system can determine whether it is safe to omit the determination of external lock conflicts thereby minimizing latency.

20 Claims, 5 Drawing Sheets

(56) References Cited

OTHER PUBLICATIONS

Yan et al., "Harmonia: A High Throughput B+Tree for GPUs", Proceedings of the 24th Symposium on Principles and Practice of Parallel Programming, Feb. 16, 2019, pp. 133-144.
Yang et al., SPMFS: A Scalable Persistent Memory File System on Optane Persistent Memory, Proceedings of the 50th International Conference on Parallel Processing, Oct. 5, 2021, 10 Pages.

* cited by examiner

STREAMLINED FILE SYSTEM MEMORY INPUT/OUTPUT OPERATIONS

BACKGROUND

Many computing systems utilize a suite of computer storage devices such as a central processing unit (CPU) cache, random access memory (RAM), and disks such as solid-state drives (SSDs) and hard disk drives (HDDs). As such, the computing system can utilize a memory hierarchy which organizes computer storage based on response time. For instance, response times for random-access memory can be typically measured in terms of nanoseconds (billionths of a second) while the response time for a hard disk drive can typically be measured in terms of milliseconds (thousandths of a second). Stated another way, accessing data stored at a hard disk drive can incur one million times the latency of accessing the same data stored in random-access memory. In this way, despite significant improvements in the speed of storage devices such as solid-state drives and hard disk drives, retrieving data from a storage device nonetheless represents a significant latency cost from the perspective of a central computing unit.

To that end, many modern file systems utilize in-memory caching to reduce the latency of file data operations such as read operations and write operations. That is, a file system can store file data in random-access memory for ready access by the central processing unit. In various examples, file data that is cached can be file data that is frequently accessed by the central processing unit and thus benefits the most from the reduced latency of random-access memory. As such, the file system can perform read and/or write operations directly on cached file data. To handle a read or write operation, the file system firsts checks a cache map structure to obtain a mapping (often referred to as a cache hit) for a file data offset to a location where the file data is cached. For a write operation, the file system copies the file data from a user and/or app memory buffer to that mapped location, and then at a later time, the file system writes the file data out to the storage device. For a read operation, the file system identifies the location in memory and copies the file data out of the cache to the user and/or app memory buffer. If there is no mapping (often referred to as a cache miss), the file system will access the data for read operations and/or write operations at the storage device, store the data in the cache, and create a mapping entry in the cache map structure.

Many file systems utilize internal locking mechanisms to ensure the cache map structure remains consistent. That is, the file system can apply an internal lock (referred to herein as an internal latch) to a storage location in the cache (e.g., a page of memory) to ensure there is no state transition when transferring data in or out of the storage location. In this way, the file system can prevent the storage location from being flushed or otherwise repurposed during an operation. Consequently, the cache map structure can be locked at a location-based level to provide granular, low-level synchronization.

However, some file systems utilize an additional high-level mechanism such as an application programming interface (API) to provide similar locking functionality at the file level (also referred to as an external lock). Such external locks can be utilized to lock some or all of a file to ensure consistency across a broader storage context. Unfortunately, such external locks can also introduce additional latency for accessing the cache map structure, thereby preventing the implementation of low-latency (e.g., lock-free) direct access paths for cache map structures. This causes further degradation in file system efficiency. It is with respect to this and other considerations that the disclosure made herein is presented.

SUMMARY

The techniques described herein enable file systems configured to implement external locks to streamline input/output (I/O) operations for cached file data. This is accomplished by utilizing a direct access path and an optimization flag that indicates the status of an external lock for given file data. As mentioned above, an external lock can prevent changes to some or all of a file (e.g., file data). By checking the optimization flag prior to executing an operation, a file system can determine whether the direct access path is available for the current operation. In the context of the present disclosure, a direct access path is a file system method that enables a thread to directly access the storage locations defined by a cache map structure.

The direct access path is in contrast to an indirect access path in which the thread must resolve conflicts that arise when another thread acquires the external lock for the given file data. That is, the direct access path omits considerations for external lock conflicts thereby reducing the latency associated with input/output operations. As will be described below, such conflicts can arise based on a type of the external lock. As such, the direct access path for the given file data can be considered by the file system as "safe" when the external lock for the file data is inactive. Accordingly, the file system can check the optimization flag indicating the status of the external lock when deciding whether to utilize the direct access path or the indirect access path for a given file input/output operation by a thread. In this way, the file system can minimize the latency of file input/output operations.

In a specific example, operating on file data via the direct access path includes a read operation at a coarse-grained memory location (e.g., a file) and a write operation at a fine-grained memory location (e.g., a page of memory). These operations can be associated with an individual thread executed by a central processing unit (CPU), a virtual machine, and the like. In this example, the read operation is checking the optimization flag to determine whether an external lock for a given file data is active and subsequently acquiring the external lock if the optimization flag indicates that the external lock is inactive. Meanwhile, the write operation is a modification to a subset of the file data at a specific memory location. As such, the thread also acquires an internal latch for the memory location to perform the write operation.

Consequently, read operations at the coarse-grained memory location can be performed by multiple threads without contention thereby enabling an arbitrary number of threads to perform the read operation. That is, performing a read operation on the optimization flag is horizontally scalable. Conversely, write operations at the fine-grained memory location by multiple threads do result in contention as concurrent modifications can lead to data corruption and other failures. As such, the multiple threads take turns performing write operations by acquiring and subsequently releasing the internal latch.

In another example, the optimization flag indicates that the external lock for the file data is active. Accordingly, all operations on the file data synchronize requests for the external lock at the file level to prevent conflicts. Consequently, file-level synchronization at the external lock can introduce contention when multiple threads are attempting to operate on the same file data. However, the multiple threads may not be targeting the same memory location (e.g., page) resulting in comparatively less contention at the fine-grained internal latch level.

Generally described, the file system can execute a plurality of threads in which each thread executes file input/output operations. As such, the file system is responsible for organizing and synchronizing the plurality of threads. Accordingly, the file system can receive, from a first thread, a request for an external lock for file data that is distributed across a plurality of storage locations. In a specific example, the first thread issues the request for the external lock in preparation for an input/output operation. In various examples, an individual storage location is a page of a random-access memory (also referred to as main memory). Consequently, an individual storage location can be said to contain a subset of the file data constituting a file where the external lock is applied to some or all of the storage locations for the file.

To determine whether to grant the request for the external lock and avoid the increased latency of the indirect access path, the file system can check an optimization flag that indicates the status of the external lock. The optimization flag can be a binary value that is either set (1) or cleared (0). In a specific example, a set optimization flag indicates that the external lock is active while a cleared optimization flag indicates that the external lock is inactive. In addition, the optimization flag can be a probabilistic value indicating a likelihood that the external lock is active. That is, a set optimization flag indicates that the external lock is most likely active while a cleared optimization flag indicates that the external lock is most likely inactive. The optimization flag can be configured in this way due to the short timescales of memory input/output operations (e.g., millionths or even billionths of a second) preventing a definite determination of status.

In the event the optimization flag indicates that the external lock for the file data is inactive, the file system can grant the first thread's request for the external lock. Accordingly, the file system configures the optimization flag to indicate that the external lock is now active (e.g., setting the optimization flag). In response, the first thread can begin executing its file input/output operation via the direct access path. However, before traversing the direct access path, the file system checks a cache map structure to locate the file data. As mentioned, the external lock can be applied to some or all of the file data.

However, while the first thread was in the process of requesting and acquiring the external lock, a second thread may have begun operating on the same file data. In a specific example, the second thread is executing a read operation in which the second thread acquires an internal latch that is applied to one of the storage locations containing a subset of the file data. As mentioned above, the internal latch enables the second thread to lock a specific storage location (e.g., a page of main memory) and thus prevent changes to the subset of the file data during the read operation. The status of these internal latches can be recorded and tracked by the cache map structure. Accordingly, the first thread can determine that the second thread acquired the internal latch for the subset of the file data. In response, the first thread waits for the second thread to release the internal latch before proceeding with the its own input/output operation.

The techniques described herein address several technical challenges associated with modern file systems. Namely, many modern file systems can struggle to manage latencies associated with input/output operations while maintaining mechanisms for synchronization and scalability. As mentioned above, some file systems may utilize high-level external locking mechanisms such as an application programming interface (API) to enable file-level synchronization in addition to more granular internal latches for individual storage locations. Such locking mechanisms can be useful for maintaining the integrity of file data, especially in complex computing systems in which file data may be accessed by multiple computers (e.g., multiprocessor systems) as well as remote accesses. However, external locking mechanisms can consequently impose additional latencies associated with resolving conflicts that arise when multiple threads are performing in-cache input/output operations.

By implementing a direct access path and an associated optimization flag, the present techniques enable file systems to retain the benefits of external locking mechanisms while bypassing potential performance degradations. For instance, in a typical external lock file system, checks for external lock conflicts must be performed for every input/output operation leading to the aforementioned latencies. In contrast, the file system proposed herein can simply check the optimization flag to determine whether an external lock for a given file data is already active. In this way, the disclosed techniques enable the file system to implement a direct access path that omits determinations for external lock conflicts leading to reduced latencies. Stated another way, the optimization flag enables the file system to determine when external lock conflict checks are unnecessary and accordingly improve performance by bypassing such checks.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein enable file systems to perform streamlined input/output operations utilizing a direct access path while retaining external file-level locking mechanisms. This is accomplished through an optimization flag indicating the status of an external lock for a given set of file data which can be a whole file or a part of the file. By checking the optimization flag, the file system can determine whether the direct access path is available. In this way, the disclosed techniques enable the file system to minimize latencies resulting from in-cache input/output operations.

Various examples, scenarios, and aspects that enable streamlined memory input/output operations are described below with respect to FIGS. 1-5.

Figure 1:
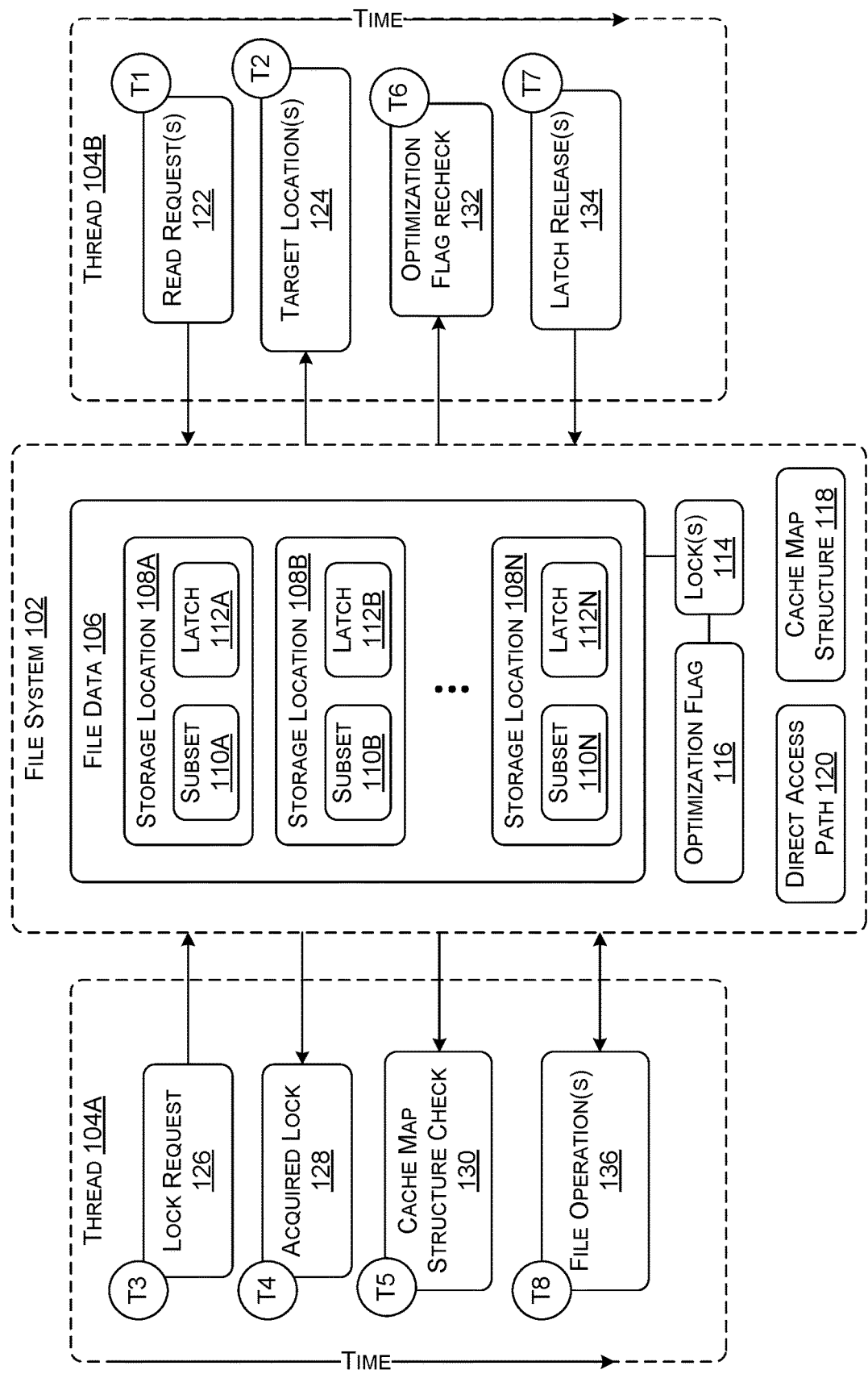
FIG. 1 is a block diagram illustrating a first example scenario of a system for performing streamlined file system memory input/output operations in which a first thread requests an external lock after a second thread acquires an internal latch.

FIG. 1 illustrates an environment 100 in which a file system 102 is executing two threads 104A and 104B. In various examples, a thread is a sequence of programmed instructions managed by an operating system and can be a component of a process (e.g., a file system process). As such, a thread can be considered a unit of computing execution comprising instructions defining a series of operations. As mentioned above, the context of the present disclosure is directed to a cache of a file system 102. That is, rather than operating on data at a storage device such as a solid-state drive (SSD) or hard disk drive (HDD), the file system can cache file data 106 in a main memory such as random-access memory (RAM) for ready access.

In various examples, the file data 106 can be the contents of a single file. However, it should be understood that the file system can store a plurality of files in main memory. Accordingly, the file data 106 can be distributed across a plurality of storage locations 108A-108N within the main memory. Each of the storage locations 108A-108N can contain a corresponding subset 110A-110N of the file data 106. In addition, each storage location 108A-108N can include an internal latch 112A-112N that enables the file system 102 to lock an individual storage location 108A. That is, an internal latch 112A can ensure that there is no state transition when transferring the subset 110A into or out of the associated storage location 108A.

The file system 102 can further include an external lock 114 for the file data 106. Like the internal latches 112A-112N above, the external lock 114 can be applied to the file data 106 to prevent state transitions when operating on the file data 106. However, while the internal latches 112A-112N can be implemented as low level components (e.g., firmware), the external lock 114 can be a high-level software component such as an application programming interface (API). In various examples, the external lock 114 can be configured to apply to some or all of the file data 106. For instance, the external lock 114 can specify a start offset and an end offset to lock a portion of the file data 106 (e.g., a number of storage locations 108A-108N).

In addition, the external lock 114 can be configured as a specific type of lock. For example, the external lock 114 can be configured as an exclusive lock 114 in which a request for the lock 114 is granted once and, when granted, is not granted again for the same file data 106. That is, granting multiple copies of the same exclusive lock 114 would cause a conflict. Conversely, the lock 114 can be configured as a shared lock 114. With a shared lock 114, the file system 102 can grant multiple requests for the external lock 114. However, subsequent requests for the external lock 114 must specify a shared lock in order to be granted as an exclusive lock would cause a lock conflict. Moreover, the shared lock can also allow the file system 102 to grant requests for internal latches 112A-112N while the external lock is active. In still another example, the external lock 114 can be configured as an opportunistic lock 114. An opportunistic lock 114 can be applied to the full file data 106 to block any incoming read and/or write operations. As such, an opportunistic lock 114 can be utilized by a file system 102 that is caching the file data 106 (e.g., a remote file system 102) remotely to ensure that retrieved file data 106 is correct and/or uncorrupted.

The file system 102 can further include an optimization flag 116 that indicates the current status of the external lock 114. Stated another way, the optimization flag 116 broadcasts the current status of the external lock 114 to the threads 104A and 104B as well as any other entities that interact with the file system 102. In various examples, the optimization flag 116 is a binary value that is managed by the file system 102 and can be either set "1" or cleared "0". In this way, checking the current status of the external lock 114 can involve a simple check of a binary value, via the optimization flag 116, rather than a more computationally expensive operation of reading the external lock 114 itself. In a specific configuration, the optimization flag 116 indicates that the external lock 114 is active when set. That is, the file system 102 configures the binary value as a "1". Conversely, the optimization flag 116 indicates that the external lock 114 is inactive when cleared (i.e., when the file system configures the binary value as a "0").

As mentioned above, the optimization flag 116 may represent a probability that the external lock 114 is active. In a specific example, the optimization flag 116 is set by the file system 102 (e.g., configured as a value of "1") to indicate that the external lock 114 is active when the file system 102 determines that the probability the external lock 114 is active is greater than or equal to a threshold probability. Consequently, the optimization flag 116 is cleared by the file system 102 (e.g., configured as a value of "0") to indicate that the external lock 114 is inactive when the file system 102 determines that the probability the external lock 114 is active is less than the threshold probability. In various examples, the probability is calculated by the file system 102 as a function of the current activity within the file system 102 such as the number of active threads 104, outstanding read and/or write requests for the file data 106, and/or a specific storage location 108A. Furthermore, the probability can be periodically recalculated by the file system 102 to reflect changing conditions within the file system 102.

A probabilistic value can be suitable for a file system 102 context due to the short timescales of in-cache input/output operations wherein the external lock 114 can be acquired and released in the span of microseconds or even nanoseconds. As such, a determination of the current status of the external lock 114 can be impractical to definitely determine.

In various examples, the file system 102 can calculate this probability based on an accounting of currently active threads 104.

To track the plurality of storage locations 108A-108N in main memory, the file system 102 can maintain a cache map structure 118. The cache map structure 118 maps the storage locations 108A-108N to an address space. In many examples, the storage locations 108A-108N are organized as pages of memory where an individual page is a fixed-length contiguous block of virtual memory providing an abstraction of the physical memory (e.g., random-access memory). That is, computing processes such as the first thread 104A and the second thread 104B interact with a virtual memory address space which is then translated into a physical memory address space. Accordingly, the cache map structure 118 provides a mapping of the virtual memory address space to the physical memory address space.

As mentioned above, including the optimization flag 116 enables the file system 102 to implement a direct access path 120 which enables direct access to the mappings defined by the cache map structure. That is, the direct access path 120 omits determinations of conflicts caused by the external lock 114 when operating on the file data 106. In this way, the direct access path 120 reduces the latency of input/output operations. However, to retain the file-level synchronization enabled by the external locks 114, the availability of the direct access path 120 can be conditional based on the status of the optimization flag 116.

To illustrate an example of the functionality of the file system 102, a first thread 104A and a second thread 104B executed by the file system 102 are shown in FIG. 1 performing a sequence of operations delineated by segments of time T. In the present example, it should be understood that time T1 occurs prior to time T2. At time T1, the second thread 104B issues a read request 122 for a specific subset 110A of the file data 106 which includes a request for an internal latch 112A for the storage location 108A of the subset 110A. In response, the file system 102 checks the status of the optimization flag 116 which indicates that, at the present time T1, the external lock 114 is inactive. As such, the file system 102 can grant the read request 122 at time T2 by applying the internal latch 112A to the storage location 108A. That is, the second thread 104B acquires 124 the internal latch 112A at time T2. In addition, the file system 102 can provide a set of target locations derived from the cache map structure 118.

Subsequently, at time T3, the first thread 104A issues a lock request 126 in preparation for an input/output operation on the file data 106. In response to the lock request 126, the file system 102 checks the optimization flag 116 which indicates that the external lock 114 is inactive. Accordingly, the file system 102 grants the lock request 126 at time T4. That is, the first thread 104A is said to have acquired 128 the external lock 114. Moreover, the file system configures the optimization flag 116 to indicate that the external lock 114 is now active. In a specific example, the file system 102 sets (1) the optimization flag 116.

Before executing the input/output operation for the first thread 104A, the file system 102 checks 130, at time T5, the cache map structure 118 to determine whether any of the internal latches 112A-112N are applied to the granular storage locations 108A-108N. This cache map structure check 130 is necessary because even if another thread (e.g., the second thread 104B) has not acquired the external lock 114, the internal latches 112A-112N can still interfere with the data access of the first thread 104A. As mentioned above, the second thread 104B indeed acquired a latch 112A at time T2 to perform a read operation which can be reflected in the cache map structure 118. In response to detecting the active latch 112A, the first thread 104A awaits a release of the latch 112A by the second thread 104B. Meanwhile, at time T6, the file system 102 performs an optimization flag recheck 132 before executing the read operation requested by the second thread 104B. The optimization flag recheck 132 is implemented to detect if the optimization flag 116 is active, thereby signaling that another thread (e.g., the first thread 104A) has since requested and acquired the external lock 114 for the file data 106.

In response to detecting that the optimization flag 116 is active via the optimization flag recheck 132, the second thread 104B releases 134 the internal latch 112A at time T7. In various examples, releasing the latch 112A can include terminating the originally requested 122 read operation. Accordingly, the second thread 104B does not perform accesses to the file data 106 and retries the read operation at a subsequent time when the optimization flag 116 indicates that the external lock 114 is inactive. That is, the second thread 104B synchronizes with the first thread 104A at the file level to prevent operation conflicts. In a different example, the second thread 104B attempts to acquire 124 the internal latch 112A after the first thread 104A executes the cache map structure check 130. In response, the second thread 104B cannot acquire the latch 112A and retries the operation at a subsequent time. In a specific example, the second thread 104B rechecks the optimization flag 116. Based on this rechecking, the second thread detects that the external lock for the file data 106 is inactive (e.g., following a completion of the operation by the first thread 104A). In response, the second thread reacquires the external lock 114 and completes the read operation.

In response to the latch release 134 by the second thread 104B, the first thread 104A can proceed to execute a file operation 136 at time T8 via the direct access path 120. In various examples, the first thread 104A may access storage locations 108A-108N that do not have a corresponding latch 112A-112N applied via the direct access path prior to the latch release 134. As mentioned, executing the file operation 136 via the direct access path 120 can omit determinations of conflicts at the external lock 114. In this way, the file system 102 minimizes the latency incurred by the file operation 136.

As described above, operating on file data via the direct access path can include a read operation at a coarse-grained memory location (e.g., a file) and a write operation at a fine-grained memory location (e.g., a page of memory). These operations can be associated with an individual thread executed by a central processing unit (CPU), a virtual machine, and the like. In this example, the read operation is checking the optimization flag to determine whether an external lock for a given file data is active and subsequently acquiring the external lock if the optimization flag indicates that the external lock is inactive. Meanwhile, the write operation is a modification to a subset of the file data at a specific memory location. As such, the thread also acquires an internal latch for the memory location to perform the write operation.

Consequently, read operations at the coarse-grained memory location can be performed by multiple threads without contention thereby enabling an arbitrary number of threads to perform the read operation. That is, performing a read operation on the optimization flag is horizontally scalable. Conversely, write operations at the fine-grained memory location by multiple threads do result in contention as concurrent modifications can lead to data corruption and other failures. As such, the multiple threads take turns performing write operations by acquiring and subsequently releasing the internal latch.

In another example, the optimization flag indicates that the external lock for the file data is active. Accordingly, all operations on the file data synchronize requests for the external lock at the file level to prevent conflicts. Consequently, file-level synchronization at the external lock can introduce contention when multiple threads are attempting to operate on the same file data. However, the multiple threads may not be targeting the same memory location (e.g., page) resulting in comparatively less contention at the fine-grained internal latch level.

Figure 2:
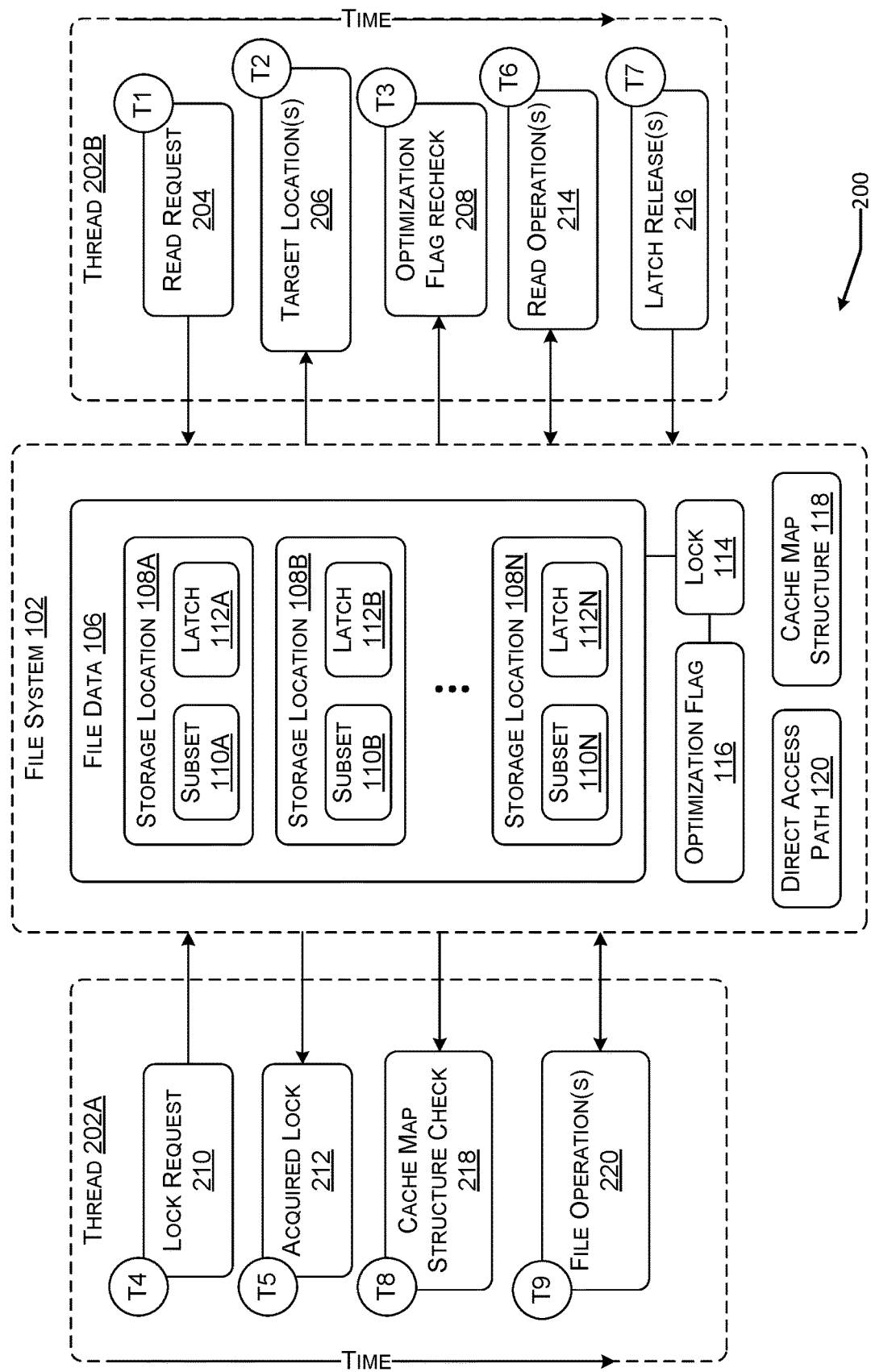
FIG. 2 is a block diagram illustrating a second example scenario of a system for performing streamlined file system memory input/output operations in which a first thread requests an external lock after a second thread acquires an internal latch and begins executing an operation.

Turning now to FIG. 2, an example environment 200 in which the file system 102 executes a first thread 202A and a second thread 202B are shown and described. Similar to the example discussed above with respect to FIG. 1, the second thread 202B issues a read request 204 for a specific subset 110A of the file data 106 at time T1. In response, the file system 102 checks the optimization flag 116 which, at time T1, indicates that the external lock 114 is inactive. Accordingly, the file system 102 provides a target location 206 at time T2 pursuant to the read request 204 identifying the storage location 108A for the requested subset 110A and applying the internal latch 112A to the storage location 108A. At time T3, the file system 102 performs an optimization flag recheck 208 before executing the read request 204. At the present time T3, the optimization flag recheck 208 detects indicates that the external lock 114 is most likely inactive via the optimization flag 116.

However, at time T4, the first thread 202A issues a lock request 210. In response, the file system 102 checks the optimization flag 116 which currently indicates that the external lock 114 is inactive. Consequently, the file system 102 grants the lock request 210 and the first thread acquires 212 the external lock 114 at time T5. Meanwhile, at time T6, the file system 102 executes the read operation 214 as requested by the second thread 202B despite the first thread 202A having requested 210 and acquired 212 the external lock in the intervening time following the optimization flag recheck 208 indicating that the external lock 114 is inactive. At time T7, the file system 102 completes the read operation 214 and accordingly releases 216 the latch 112A for the target storage location 108A.

At time T8, the file system 102 executes a cache map structure check 218. In various examples, time T8 may overlap with time T7 in which the file system 102 completes the read operations 214 and releases 218 the internal latch 112A. In a specific example, the latch release 216 is completed prior to the cache map structure check 218. Consequently, the cache map structure check 218 indicates that there are no active internal latches 112A-112n for the file data 106. In an alternative example, the cache map structure check 218 is completed prior to the latch release 216. As such, the cache map structure check 218 indicates that the internal latch 112 is active for the storage location 108A. In response, the thread 202A waits for the latch release 216 to complete. Finally, at time T9, the file system 102 executes the file operations 220 via the direct access path 120 following confirmation of the latch release 216.

Figure 3:
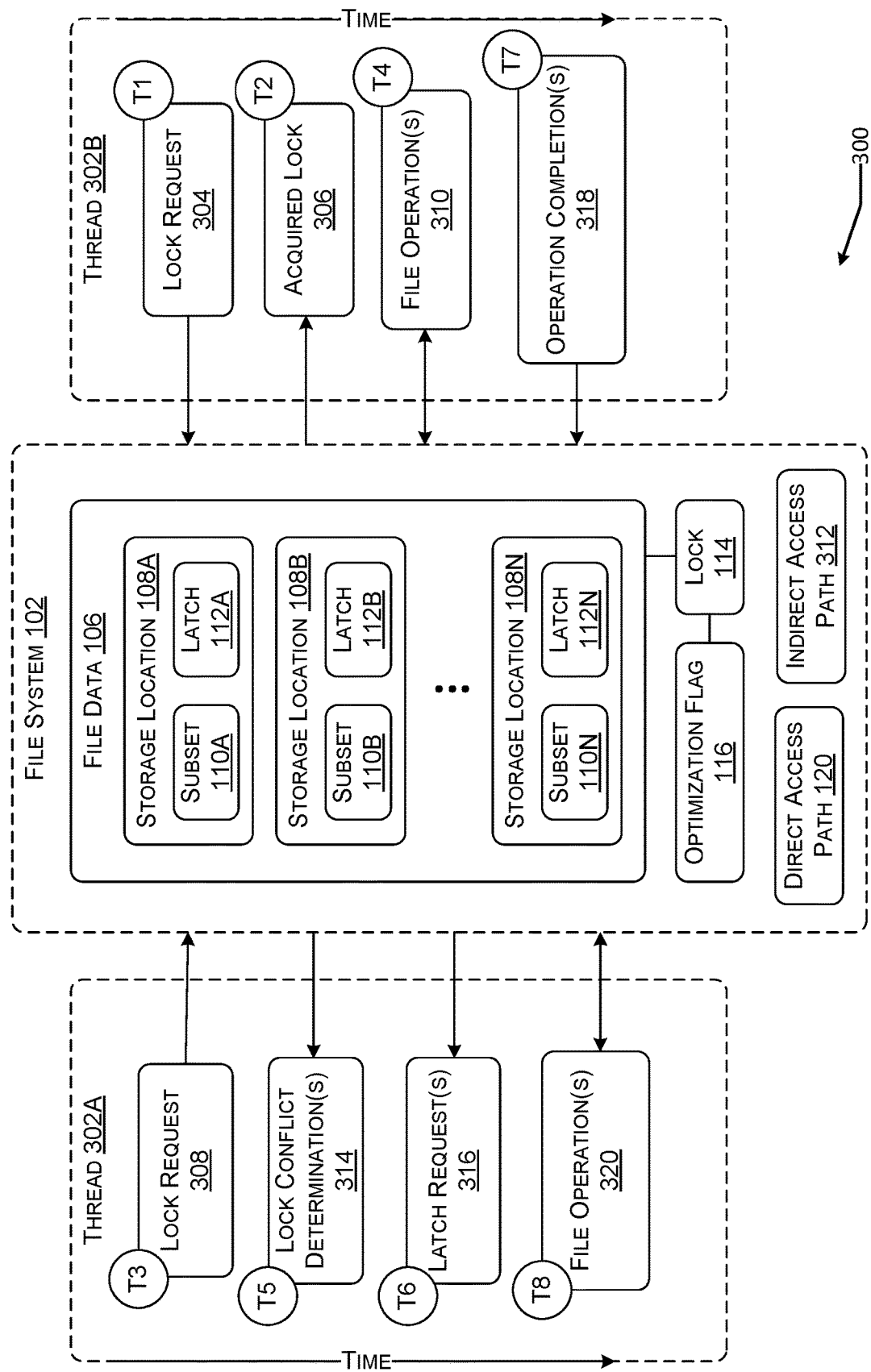
FIG. 3 is a block diagram illustrating a third example scenario of a system for performing streamlined file system memory input/output operations in which a first thread requests an external lock after a second thread has already acquired the external lock.

Turning now to FIG. 3, another example environment 300 in which the file system 102 executes two threads 302A and 302B are shown and described. Like the examples discussed above, the scenario illustrated in FIG. 3 is described as a series of events delineated by times T1-T8. However, it should be understood that two or more different times may overlap during execution (e.g., T2 overlaps with T3). Moreover, the timescales of the described operations can be short spanning microseconds or even nanoseconds.

As shown in FIG. 3 a second thread 302B issues a lock request 304 at time T1. In response, the file system 102 checks the optimization flag 116 to determine whether the external lock 114 is currently active. That is, the file system 102 determines whether another thread (e.g., the first thread 302A) has already acquired the external lock 114 for the file data 106. In the present scenario, the optimization flag 116 indicates that the external lock 114 is inactive. Accordingly, the file system 102 grants the lock request 304 to the second thread 302B at time T2. As such, the second thread 302B is said to have acquired 306 the external lock 114.

Subsequently, at time T3, the first thread 302A issues a second lock request 308. As with the lock request 304, the file system 102 checks the optimization flag 116 to determine whether to grant the lock request 308. Accordingly, the file system 102 detects that the optimization flag 116 indicates that the external lock 114 is active as a result of the second thread 302B having acquired 306 the external lock 114. Consequently, the file system 102 denies the lock request 308 of the first thread 302A. Meanwhile, at time T4, the second thread 302B begins executing a file operation 310 on the file data 106 (e.g., a read operation, a write operation) via the direct access path 120.

Due to the denial of the lock request 308, the first thread 302A must utilize an indirect access path 312 to access the file data 106. In contrast to the direct access path 120, the indirect access path 312 requires the first thread 302A to perform a lock conflict determination 314 at time T5 to access the storage locations 108A-108N of the file data 106. In a specific example, the lock conflict determination 314 detects a potential lock conflict. For instance, the second thread 302B may have configured the external lock 114 as an exclusive lock thereby preventing other threads (e.g., the first thread 302A) from operating on the file data 106. In response, the first thread 302A is configured to await the release of the external lock 114 by the second thread 302B.

Conversely, the lock conflict determination 314 may conclude that there are no lock conflicts (e.g., the external lock 114 is a shared lock). In response, the first thread 302A can proceed to issue one or more latch requests 316 at time T7 for individual storage locations 108A-108N containing subsets 110A-110N of the file data 106. In various examples, the latch requests 316 correspond to the storage locations 108A-108N referenced by the lock request 308 that was initially issued by the first thread 302A. For instance, the lock request 308 may request an external lock 114 for a contiguous block of memory spanning two storage locations 108A and 108B. Accordingly, upon taking the indirect access path 310, the first thread 302A issues two latch requests 316 for the latches 112A and 112B corresponding to the storage locations 108A and 108B. That is, where the lock request 308 broadly defines a storage range of main memory, the latch requests 316 granularly define specific storage locations 108A-108N.

As shown in FIG. 3, while the first thread 302A is issuing the latch requests 316 at time T7, the second thread 302B completes 318 the file operations 310 at time T8. In response to an operation completion 318, the second thread 302B releases the external lock 114 on the file data 106. Accordingly, the file system 102 reconfigures the optimization flag 116 to indicate that the external lock 114 for the file data 106 is inactive. Meanwhile, at time T8, the first thread 302A has since acquired the latches 112A-112N specified by the latch requests 316 and can begin executing a file operation 320. As described here, utilizing the indirect access path 312 can introduce additional latencies to a file operation 320 compared to executing a different file operation 310 via the direct access path 120. However, the indirect access path 312 can nonetheless provide a necessary option when the direct access path 120 is unavailable due to the status of the optimization flag 116. That is, the file system 102 is configured to provide the threads 302A and 302B with the path that incurs the minimal possible latency while retaining the file-level synchronization capabilities of the external lock 114.

Figure 4:
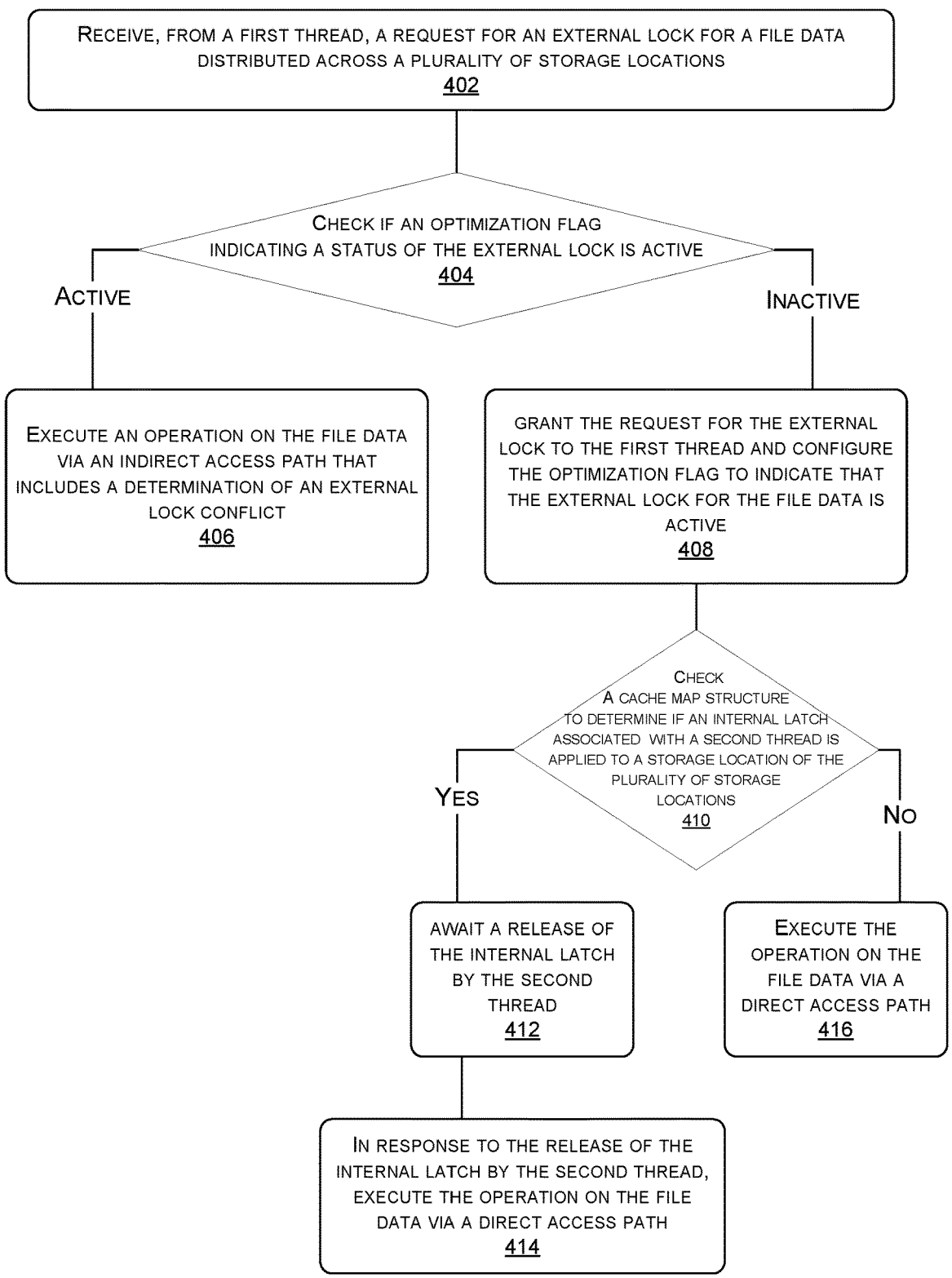
FIG. 4 is a flow diagram showing aspects of a process for performing streamlined file system memory input/output operations.

Turning now to FIG. 4, aspects of a process 400 for streamlining input/output operations for file data stored in a main memory are shown and described. With respect to FIG. 4, the process 400 begins at operation 402 where a file system receives, from a first thread, a request for an external lock for a file data distributed across a plurality of storage locations. As mentioned above, the request for the external lock can specify some or all of a given file as well as a lock type (e.g., a shared lock, an exclusive lock).

Then, at operation 404, the file system checks whether an optimization flag indicating a status of the external lock is active. In various examples, checking the optimization flag can be a probabilistic check representing a probability that the external lock is active.

If the optimization flag is active, the process 400 proceeds to operation 406 where the file system executes an operation, by the first thread, on the file data via an indirect access path that includes a determination of an external lock conflict. As described above, the external lock can be an exclusive lock preventing concurrent operations on the file data. Conversely, the external lock can be a shared lock enabling concurrent operations on the file data. In scenarios where the external lock is an exclusive lock, the file system will not grant subsequent lock requests. Conversely, where the external lock is a shared lock, the file system can grant subsequent requests for the shared lock.

If the optimization flag is inactive, the process 400 proceeds to operation 408, in which the file system grants the request for the external lock to the first thread and configures the optimization flag to indicate that the external lock for the file data is active.

Subsequently, at operation 410, the file system checks a cache map structure to determine whether an internal latch associated with a second thread is applied to a storage location of the plurality of storage locations. As mentioned above, this check is necessary as even if another thread (e.g., the second thread) does not possess the external lock, the other thread may nonetheless have locked a specific subset of the file data preventing other operations from occurring.

If the cache map structure check of operation 410 determines that the internal latch is applied, the process 400 proceeds to operation 412 in which the file system awaits a release of the internal latch by the second thread. In one example, the internal latch is released by the second thread after the operation being performed by the second thread is terminated (e.g., not completed) because an optimization flag recheck yields that the external lock has been acquired by the first thread before the second thread initiates the operation. In another example, the internal latch is released by the second thread after the operation being performed by the second thread is completed (e.g., not terminated) because an optimization flag recheck yields that the external lock has not yet been acquired by the first thread before the second thread initiates the operation.

Then, at operation 414, in response to the release of the internal latch by the second thread, the file system executes a second operation by the first thread on the file data via a direct access path that omits a determination of an external lock conflict enabled by the checking of the optimization flag. As described above, utilizing the direct access path reduces the latencies incurred by the second operation thereby improving the efficiency and performance of the file system.

However, if the ache map structure check of operation 410 determines that the internal latch is not applied, the process 400 proceeds to operation 416 in which the file system executes the second operation by the first thread on the file data via the direct access path that omits the determination of an external lock conflict enabled by the checking of the optimization flag.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 400 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 400 may also be implemented in other ways. In addition, one or more of the operations of the process 400 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 5:
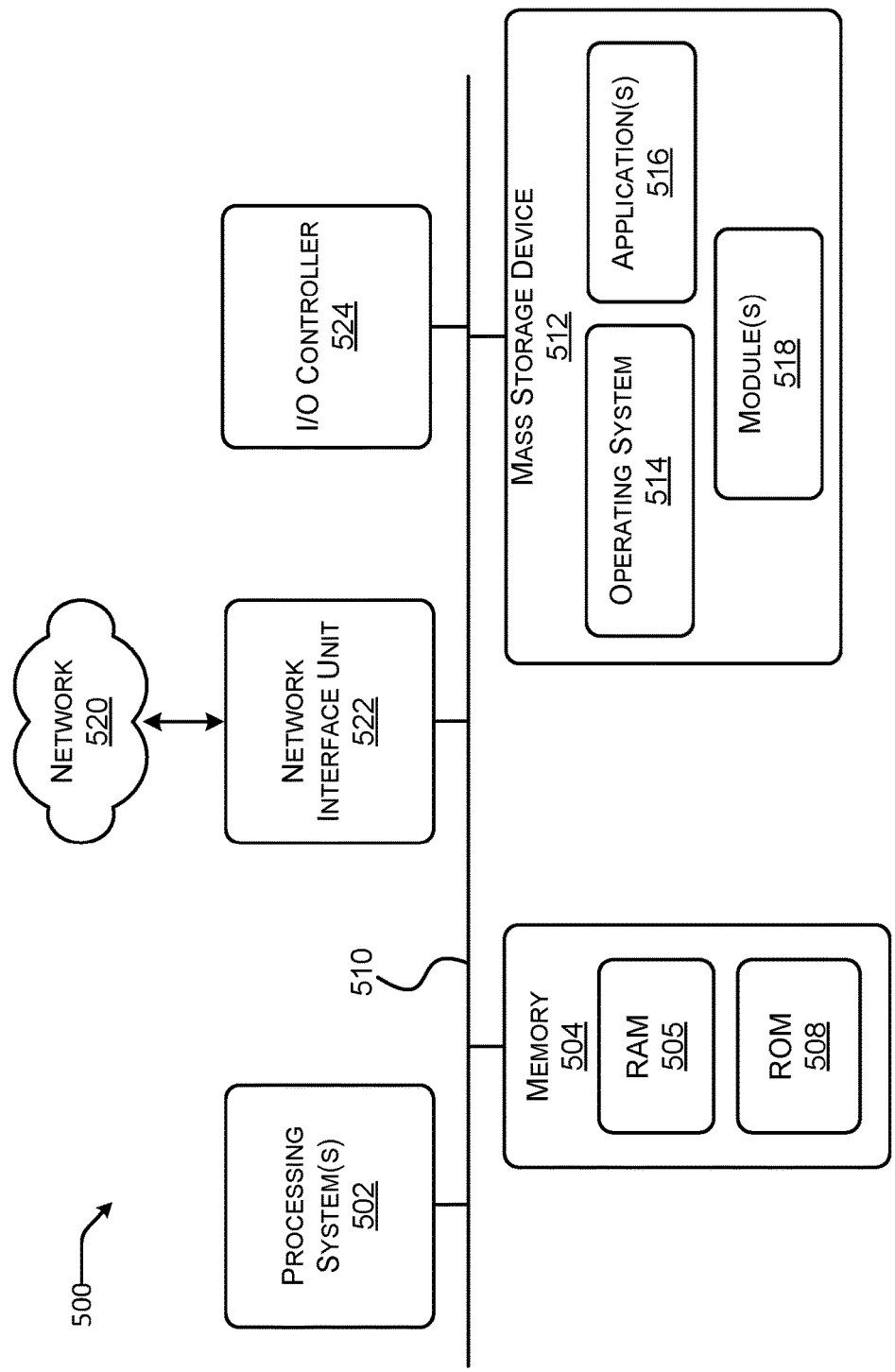
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a device, capable of executing computer instructions (e.g., a module or a program component described herein). The computer architecture 500 illustrated in FIG. 5 includes processing system 502, a system memory 504, including a random-access memory 505 (RAM) and a read-only memory (ROM) 508, and a system bus 510 that couples the memory 504 to the processing system 502. The processing system 502 comprises processing unit(s). In various examples, the processing unit(s) of the processing system 502 are distributed. Stated another way, one processing unit of the processing system 502 may be located in a first location (e.g., a rack within a datacenter) while another processing unit of the processing system 502 is located in a second location separate from the first location. Moreover, the systems discussed herein can be provided as a distributed computing system such as a cloud service.

Processing unit(s), such as processing unit(s) of processing system 502, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing system 502 through a mass storage controller connected to the bus 510. The mass storage device 512 and its associated computer-readable media provide non-volatile storage for the computer architecture 500. Although the description of computer-readable media contained herein refers to a mass storage device, the computer-readable media can be any available computer-readable storage media or communication media that can be accessed by the computer architecture 500.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

The software components described herein may, when loaded into the processing system 502 and executed, transform the processing system 502 and the overall computer architecture 500 from a general-purpose computing system into a special-purpose computing system customized to facilitate the functionality presented herein. The processing system 502 may be constructed from any number of transistors or other discrete circuit elements, which may individually or collectively assume any number of states. More specifically, the processing system 502 may operate as a finite-state machine, in response to executable instructions contained within the software modules disclosed herein. These computer-executable instructions may transform the processing system 502 by specifying how the processing system 502 transition between states, thereby transforming the transistors or other discrete hardware elements constituting the processing system 502.

The disclosure presented herein also encompasses the subject matter set forth in the following clauses.

Example Clause A, a method comprising: receiving, from a first thread, a request for an external lock for file data distributed across a plurality of storage locations; checking that an optimization flag indicates that the external lock for the file data is inactive; in response to checking that the optimization flag indicates that the external lock for the file data is inactive: granting the request for the external lock to the first thread; and configuring the optimization flag to indicate that the external lock for the file data is active; determining, from a cache map structure, that an internal latch associated with a second thread is applied to a storage location of the plurality of storage locations, the storage location containing a subset of the file data indicating that the second thread is executing a first operation on the subset of the file data; in response to determining that the internal latch is applied to the storage location, awaiting a release of the internal latch by the second thread; and in response to the release of the internal latch by the second thread, executing a second operation by the first thread on the file data via a direct access path that omits a determination of an external lock conflict enabled by the checking of the optimization flag.

Example Clause B, the method of Example Clause A, wherein the external lock enables file-level synchronization for a file system executing the first thread and the second thread.

Example Clause C, the method of Example Clause A or Example Clause B, wherein: the second thread acquires the internal latch for the storage location; and the second thread executes a read operation on the subset of the set of file data.

Example Clause D, the method of Example Clause C, further comprising: rechecking, by the file system on behalf of the second thread, the optimization flag after the acquisition of the internal latch; detecting, based on the rechecking of the optimization flag, that the external lock is active based on the granting the request for the external lock to the first thread; in response to detecting that the external lock is active: terminating the read operation; and releasing the internal latch for the storage location.

Example Clause E, the method of Example Clause D, further comprising: rechecking, by the file system on behalf of the second thread, the optimization flag after releasing the internal latch; detecting, based on the rechecking, that the external lock for the file data is inactive following a completion of the operation by the first thread; in response to detecting that the external lock for the file data is inactive, reacquiring the internal latch for the storage location; and completing the read operation by the second thread.

Example Clause F, the method of Example Clause C, further comprising: rechecking, by the file system on behalf of the second thread, the optimization flag after the acquisition of the internal latch; detecting, based on the rechecking of the optimization flag, that the external lock is inactive as the file system has not yet granted the request for the external lock to the first thread; in response to detecting that the external lock is inactive: completing the read operation; and releasing the internal latch for the storage location.

Example Clause G, the method of any one of Example Clause A through F, wherein: the file system calculates a probability that the external lock for the file data is active; and the optimization flag is configured by the file system to indicate that the external lock for the file data is inactive in response to the probability that the external lock for the file data is active being below a threshold probability.

Example Clause H, a system comprising: a processing system; and a computer-readable medium having encoded thereon computer-readable instructions that when executed by the processing system, cause the system to perform operations comprising: receiving, from a thread, a request for an external lock for file data distributed across a plurality of storage locations; and checking an optimization flag to determine whether the optimization flag indicates that the external lock for the file data is active; in response to determining that the optimization flag indicates that the external lock for the file data is active, executing the operation on the file data via an indirect access path including a determination of an external lock conflict; or in response to determining that the optimization flag indicates that the external lock for the file data is inactive, granting the request for the external lock and executing the operation on the file data via a direct access path, the direct access path omitting the determination of the external lock conflict.

Example Clause I, the system of Example Clause H, wherein executing the operation via the indirect access path comprises: determining that the external lock is an exclusive external lock indicating an external lock conflict; and in response to determining that the external lock is an exclusive external lock indicating an external lock conflict, awaiting a release of the exclusive lock prior to executing the operation.

Example Clause J, the system of Example Clause H, wherein executing the operation via the indirect access path comprises: determining that the external lock is a shared external lock indicating no external lock conflict; and in response to determining that the external lock is a shared external lock indicating no external lock conflict, issuing, by the first thread, a request for a plurality of internal latches corresponding to the plurality of storage locations.

Example Clause K, the system of any one of Example Clause H through J, wherein: the optimization flag is determined to indicate that the external lock for the file data is active; the thread is a first thread; and the external lock is associated with a second thread.

Example Clause L, the system of Example Clause K, wherein the second thread executes another operation on the file data via the direct access path that omits the determination of the external lock conflict.

Example Clause M, the system of Example Clause L, wherein the second thread releases the external lock following a completion of the other operation on the file data.

Example Clause N, a system comprising: a processing system; and a computer-readable medium having encoded thereon computer-readable instructions that when executed by the processing system cause the system to perform operations comprising: receiving, from a first thread, a request for an external lock for file data distributed across a plurality of storage locations; checking that an optimization flag indicates that the external lock for the file data is inactive; in response to checking that the optimization flag indicates that the external lock for the file data is inactive: granting the request for the external lock to the first thread; and configuring the optimization flag to indicate that the external lock for the file data is active; determining, from a cache map structure, that an internal latch associated with a second thread is applied to a storage location of the plurality of storage locations, the storage location containing a subset of the file data indicating that the second thread is executing a first operation on the subset of the file data; in response to determining that the internal latch is applied to the storage location, awaiting a release of the internal latch by the second thread; and in response to the release of the internal latch by the second thread, executing a second operation by the first thread on the file data via a direct access path that omits a determination of an external lock conflict enabled by the checking of the optimization flag.

Example Clause O, the system of Example Clause N, wherein the external lock enables file-level synchronization for a file system executing the first thread and the second thread.

Example Clause P, the system of Example Clause N or Example Clause O, wherein: the second thread acquires the internal latch for the storage location; and the second thread executes a read operation on the subset of the set of file data.

Example Clause Q, the system of Example Clause P, wherein the operations further comprise: rechecking, by the file system on behalf of the second thread, the optimization flag after the acquisition of the internal latch; detecting, based on the rechecking of the optimization flag, that the external lock is active based on the granting the request for the external lock to the first thread; in response to detecting that the external lock is active: terminating the read operation; and releasing the internal latch for the storage location.

Example Clause R, the system of Example Clause Q, wherein the operations further comprise: rechecking, by the file system on behalf of the second thread, the optimization flag after releasing the internal latch; detecting, based on the rechecking, that the external lock for the file data is inactive following a completion of the operation by the first thread; in response to detecting that the external lock for the file data is inactive, reacquiring the internal latch for the storage location; and completing the read operation by the second thread.

Example Clause S, the system of Example Clause P, wherein the operations further comprise: rechecking, by the file system on behalf of the second thread, the optimization flag after the acquisition of the internal latch; detecting, based on the rechecking of the optimization flag, that the external lock is inactive as the file system has not yet granted the request for the external lock to the first thread; in response to detecting that the external lock is inactive: completing the read operation; and releasing the internal latch for the storage location.

Example Clause T, the system of any one of Example Clause H through S, wherein: the file system calculates a probability that the external lock for the file data is active; and the optimization flag is configured by the file system to indicate that the external lock for the file data is inactive in response to the probability that the external lock for the file data is active being below a threshold probability.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different threads).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
   receiving, from a first thread, a request for an external lock for file data distributed across a plurality of storage locations;
   determining that an optimization flag indicates that a status of the external lock for the file data is inactive;
   in response to determining that the optimization flag indicates that the status of the external lock for the file data is inactive:
      granting the request for the external lock to the first thread; and
      configuring the optimization flag to indicate that the external lock for the file data is active;
   determining, from a cache map structure, that an internal latch associated with a second thread is applied to a storage location of the plurality of storage locations, the storage location containing a subset of the file data indicating that the second thread is executing a first operation on the subset of the file data;
   in response to determining that the internal latch is applied to the storage location, awaiting a release of the internal latch by the second thread; and
   in response to the release of the internal latch by the second thread, executing a second operation by the first thread on the file data via a direct access path that omits a check for an external lock conflict enabled by the optimization flag.

2. The method of claim 1, wherein the external lock enables file-level synchronization for a file system executing the first thread and the second thread.

3. The method of claim 2, wherein:
   the second thread acquires the internal latch for the storage location; and
   the second thread executes a read operation on the subset of the set of file data.

4. The method of claim 3, further comprising:
   rechecking, by the file system on behalf of the second thread, the optimization flag after the acquisition of the internal latch;
   detecting, based on the rechecking of the optimization flag, that the external lock is active based on the granting the request for the external lock to the first thread;
   in response to detecting that the external lock is active:
      terminating the read operation; and
      releasing the internal latch for the storage location.

5. The method of claim 4, further comprising:
   rechecking, by the file system on behalf of the second thread, the optimization flag after releasing the internal latch;
   detecting, based on the rechecking, that the external lock for the file data is inactive following a completion of the operation by the first thread;
   in response to detecting that the external lock for the file data is inactive, reacquiring the internal latch for the storage location; and
   completing the read operation by the second thread.

6. The method of claim 3, further comprising:
rechecking, by the file system on behalf of the second thread, the optimization flag after the acquisition of the internal latch;
detecting, based on the rechecking of the optimization flag, that the external lock is inactive as the file system has not yet granted the request for the external lock to the first thread;
in response to detecting that the external lock is inactive:
completing the read operation; and
releasing the internal latch for the storage location.

7. The method of claim 1, wherein:
a file system calculates a probability that the external lock for the file data is active; and
the optimization flag is configured by the file system to indicate that the external lock for the file data is inactive in response to the probability that the external lock for the file data is active being below a threshold probability.

8. A system comprising:
a processing system; and
a computer-readable medium having encoded thereon computer-readable instructions that when executed by the processing system, cause the system to perform operations comprising:
receiving, from a thread, a request for an external lock for file data distributed across a plurality of storage locations;
determining whether an optimization flag indicates that a status of the external lock for the file data is active;
in response to determining that the optimization flag indicates that the status of the external lock for the file data is active, executing an operation on the file data via an indirect access path that includes a check for an external lock conflict with another thread; or
in response to determining that the optimization flag indicates that the status of the external lock for the file data is inactive;
granting the request for the external lock; and
executing the operation on the file data via a direct access path that omits the check for the external lock conflict with the other thread.

9. The system of claim 8, wherein executing the operation via the indirect access path comprises:
determining that the external lock is an exclusive external lock indicating the external lock conflict; and
in response to determining that the external lock is the exclusive external lock indicating the external lock conflict, awaiting a release of the exclusive external lock prior to executing the operation.

10. The system of claim 8, wherein executing the operation via the indirect access path comprises:
determining that the external lock is a shared external lock indicating no external lock conflict; and
in response to determining that the external lock is the shared external lock indicating no external lock conflict, issuing, by the first thread, a request for a plurality of internal latches corresponding to the plurality of storage locations.

11. The system of claim 8, wherein the other thread executes another operation on the file data via the direct access path that omits the check for the external lock conflict.

12. The system of claim 11, wherein the other thread releases the external lock following a completion of the other operation on the file data.

13. A system comprising:
a processing system; and
a computer-readable medium having encoded thereon computer-readable instructions that when executed by the processing system cause the system to perform operations comprising:
receiving, from a first thread, a request for an external lock for file data distributed across a plurality of storage locations;
determining that an optimization flag indicates that a status of the external lock for the file data is inactive;
in response to determining that the optimization flag indicates that the status of the external lock for the file data is inactive:
granting the request for the external lock to the first thread; and
configuring the optimization flag to indicate that the external lock for the file data is active;
determining, from a cache map structure, that an internal latch associated with a second thread is applied to a storage location of the plurality of storage locations, the storage location containing a subset of the file data indicating that the second thread is executing a first operation on the subset of the file data;
in response to determining that the internal latch is applied to the storage location, awaiting a release of the internal latch by the second thread; and
in response to the release of the internal latch by the second thread, executing a second operation by the first thread on the file data via a direct access path that omits a check for an external lock conflict enabled by the optimization flag.

14. The system of claim 13, wherein the external lock enables file-level synchronization for a file system executing the first thread and the second thread.

15. The system of claim 14, wherein:
the second thread acquires the internal latch for the storage location; and
the second thread executes a read operation on the subset of the file data.

16. The system of claim 15, wherein the operations further comprise:
rechecking, by the file system on behalf of the second thread, the optimization flag after the acquisition of the internal latch;
detecting, based on the rechecking of the optimization flag, that the external lock is active based on the granting the request for the external lock to the first thread;
in response to detecting that the external lock is active:
terminating the read operation; and
releasing the internal latch for the storage location.

17. The system of claim 16, wherein the operations further comprise:
rechecking, by the file system on behalf of the second thread, the optimization flag after releasing the internal latch;
detecting, based on the rechecking, that the external lock for the file data is inactive following a completion of the operation by the first thread;
in response to detecting that the external lock for the file data is inactive, reacquiring the internal latch for the storage location; and
completing the read operation by the second thread.

18. The system of claim 15, wherein the operations further comprise:

rechecking, by the file system on behalf of the second thread, the optimization flag after the acquisition of the internal latch;

detecting, based on the rechecking of the optimization flag, that the external lock is inactive as the file system has not yet granted the request for the external lock to the first thread;

in response to detecting that the external lock is inactive:
completing the read operation; and
releasing the internal latch for the storage location.

19. The system of claim 13, wherein:

a file system calculates a probability that the external lock for the file data is active; and the optimization flag is configured by the file system to indicate that the external lock for the file data is inactive in response to the probability that the external lock for the file data is active being below a threshold probability.

20. The system of claim 8, wherein the optimization flag comprises a binary value that is either set to one or cleared to zero.

* * * * *